US006907582B2

(12) United States Patent
Stanley

(10) Patent No.: US 6,907,582 B2
(45) Date of Patent: Jun. 14, 2005

(54) COMMUNICATION OF INFORMATION THROUGH BACKGROUND MODULATION IN AN INFORMATION DISPLAY

(75) Inventor: Randy P. Stanley, Aptos, CA (US)

(73) Assignee: Intel Corporation, Santa Clara, CA (US)

(*) Notice: Subject to any disclaimer, the term of this patent is extended or adjusted under 35 U.S.C. 154(b) by 509 days.

(21) Appl. No.: 09/966,652

(22) Filed: Sep. 27, 2001

(65) Prior Publication Data

US 2003/0058287 A1 Mar. 27, 2003

(51) Int. Cl.$^7$ .............................................. G06F 17/00
(52) U.S. Cl. ...................... 715/963; 715/708; 715/866; 345/440; 702/3; 702/4
(58) Field of Search ................ 345/835, 839, 345/900, 440, 855, 846; 702/3, 4; 715/963, 708, 866

(56) References Cited

U.S. PATENT DOCUMENTS

| | | | | |
|---|---|---|---|---|
| 5,892,519 A | * | 4/1999 | Hirai | 345/440 |
| 6,278,456 B1 | * | 8/2001 | Wang et al. | 345/700 |
| 6,496,780 B1 | * | 12/2002 | Harris et al. | 702/3 |
| 6,661,438 B1 | * | 12/2003 | Shiraishi et al. | 345/835 |
| 6,714,222 B1 | * | 3/2004 | Bjorn et al. | 345/839 |

OTHER PUBLICATIONS

Basterfield, Daniel. http://www.basterfield.com/pc110/pc110idx.htm Mar. 23, 2004.*
Raje Software (Focus on Today) Sep. 23, 1999.*
Basterfield, Daniel. http://www.basterfield.com/pc110/pc110idx.htm Mar. 23, 2004.*
Raje Software (Focus on Today) Sep. 23, 1999 (4 Screen Shots).*
Suregurad http://www.sureguard.com.au/solarnorthamerica.html Mar. 8, 2004 (4 Screen Shots).*

* cited by examiner

Primary Examiner—Kristine Kincaid
Assistant Examiner—Boris Pesin
(74) Attorney, Agent, or Firm—Blakely, Sokoloff, Taylor & Zafman LLP

(57) ABSTRACT

An apparatus includes an information display, wherein a value of a variable is selected from the group consisting of percentage of maximum daylight, sunrise, sunset, phase of the moon, tide height, wave height, wind speed, probability of precipitation, a birthday, a graduation day, and an anniversary. The value of the variable pertains to a particular time and the value of the variable is associated with a portion of the information display.

18 Claims, 8 Drawing Sheets

FIGURE 2
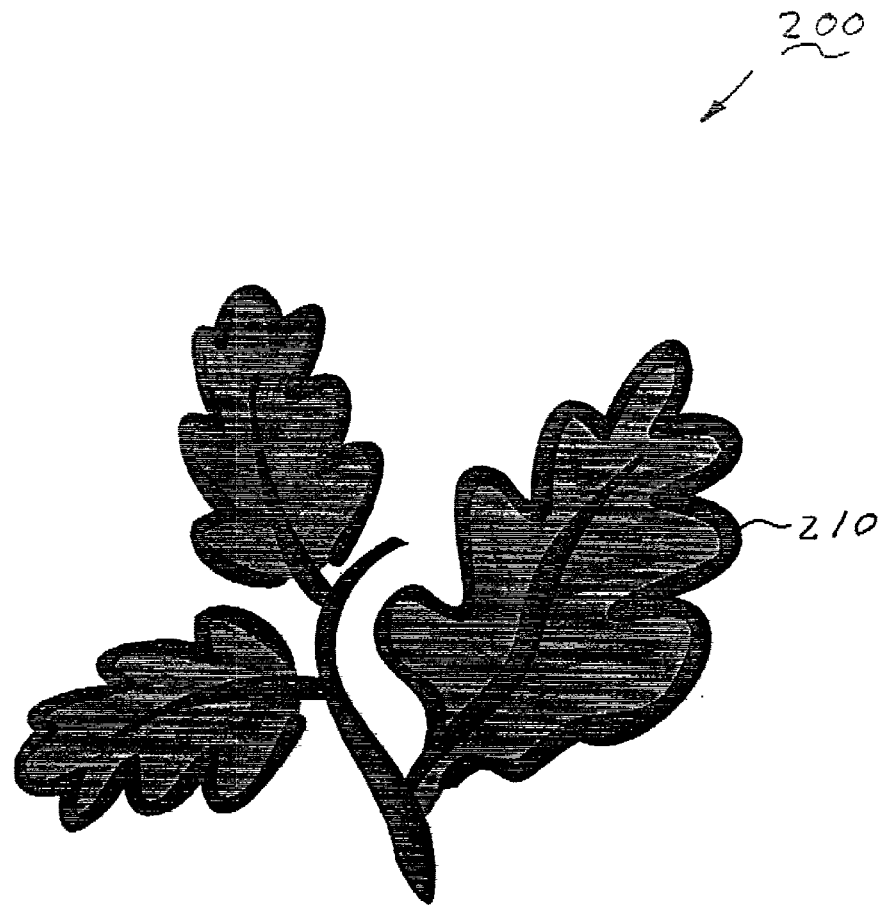
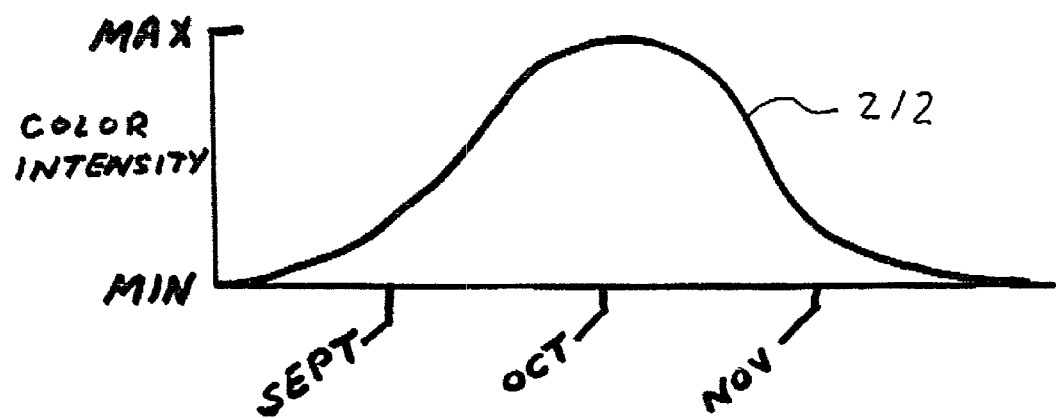

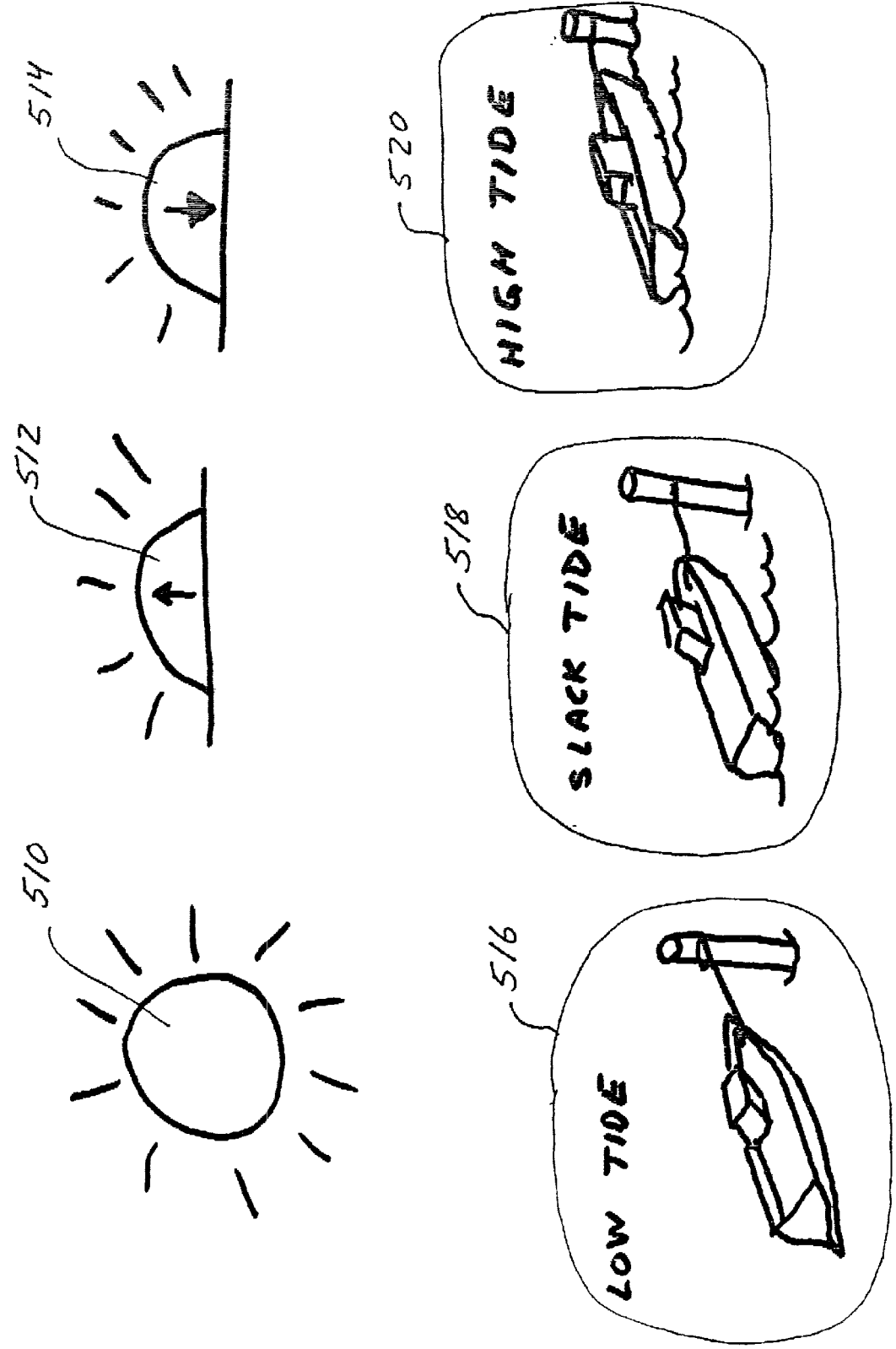

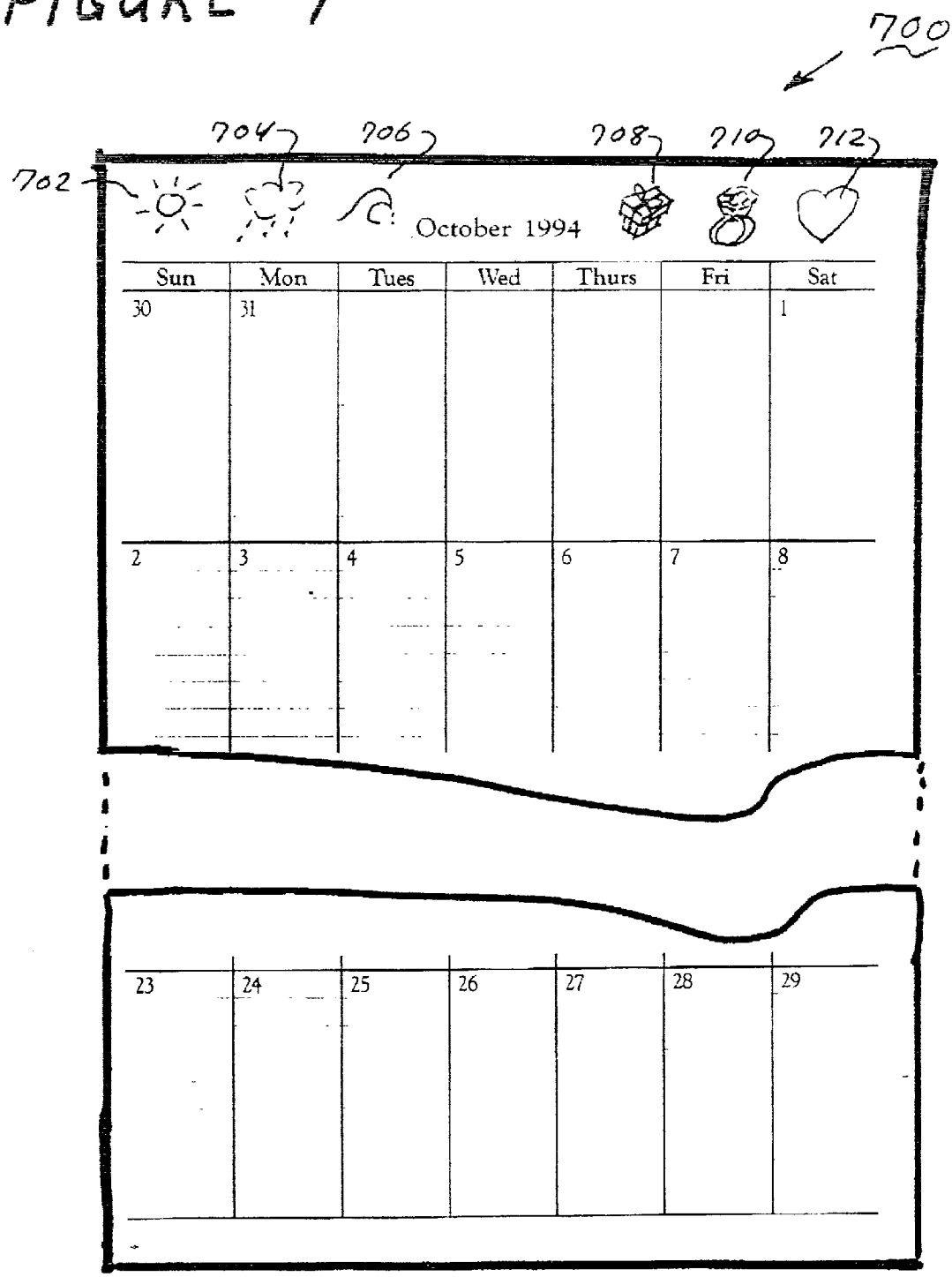

COMMUNICATION OF INFORMATION THROUGH BACKGROUND MODULATION IN AN INFORMATION DISPLAY

BACKGROUND OF THE INVENTION

1. Field of the Invention

This invention relates generally to information displays, and more specifically to communicating information through the appearance of the background of the information display.

2. Art Background

Information displays are part of data processing systems and are used to communicate information to a user. Data processing systems exist in many configurations. Desk side, desktop, and laptop computers are examples of data processing systems that employ information displays. A physically smaller example of a data processing system employing an information display is a handheld computer. Handheld computers are known in the art by different names, such as a personal data assistant (PDA). Information can be stored within the PDA and retrieved for use by the user. The PDA can be used to help plan the events occurring in the user's life.

Personal Information Management (PIM) software provides scheduling functionality to the different computers mentioned above. Examples of scheduling functionality include daily, weekly, monthly, and yearly calendars. Application software that provides daily task scheduling and organization are typically available for use on computer systems employing information displays. A computer equipped with daily task scheduling software can be used to replace daily planners previously made out of paper.

Planning for future events often requires knowledge of conditions that will exist at a time and place in the future. For example, scheduling a wedding outdoors requires knowledge of the amount of ambient light that will exist at a particular time of the day for photography considerations. Similarly, knowledge of the amount of ambient light existing at a particular time of the day or evening is necessary in order to know if outdoor lighting will be required for a barbeque or party. It is also necessary to know the height of the tide at a particular time and place in order to plan activities involving the ocean, such as fishing, surfing, and swimming. A user often needs knowledge of weather conditions existing at a future time and place.

Existing planning and scheduling software does not provide the predictive information capability necessary to plan the events in the user's life based on information pertinent to future times and places as previously described. What is needed is a way of conveying information to the user so that the user is informed and aware of future conditions that are pertinent to planning future events.

BRIEF DESCRIPTION OF THE DRAWINGS

The present invention is illustrated by way of example and is not limited in the figures of the accompanying drawings, in which like references indicate similar elements.

FIG. 2 illustrates an example of associating a quantity of information pertinent to a particular time and place with an image.

FIG. 5 illustrates variations of sunlight and tide information using variations in the appearance of an icon.

FIG. 7 illustrates an information display configured to associate information with an image and the corresponding pertinent time of association.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those skilled in the art to practice the invention. The following detailed description is, therefore, not to be taken in a limiting sense, and the scope of the invention is defined only by the appended claims.

Methods and apparatuses are disclosed that communicate to a user of an information display, a quantity of information that is pertinent to a particular time and/or place. The information may be pertinent to a period of time or the information may be associated uniquely with an instant in time. Alternatively, the information may represent an integral over a period of time. The amount of ambient sunlight existing at a particular time of the day is an example of information associated uniquely with an instant of time. The time of high or low tide on a particular day is another example of information associated uniquely with an instant of time. A phase of the moon is an example of information generally intended to represent an integral over a period of time. Birthdays or anniversaries are examples of information that is pertinent to a period of time, e.g., a particular day.

Information may be presented to a user in a variety of ways according to the teachings of the present invention. In one embodiment of the present invention, the quantity of information may be communicated using an icon or image to represent the information, such as a ring to represent an anniversary. The icon or image may be portrayed in different ways within the teaching of the present invention. In one embodiment, the icon or image can be displayed on the information display as a gray scale or colored image. Alternatively, the icon or image can be displayed as a watermark image within the background of the information display. In another embodiment of the present invention, the quantity of information may be relayed by varying the backlight of the information display to represent the percentage of sunlight available at a particular time of the day.

Figure 1:
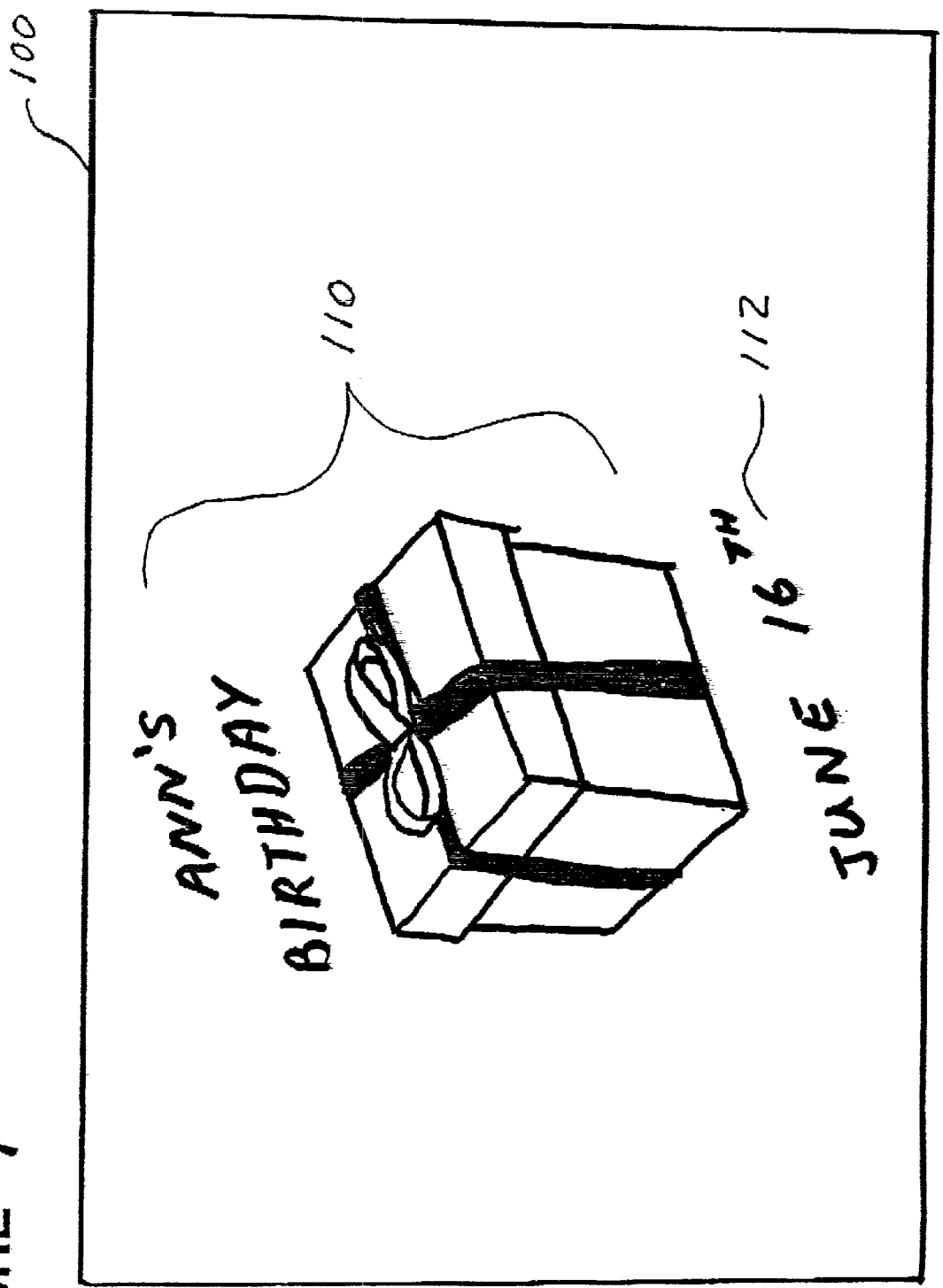
FIG. 1 illustrates associating a quantity of information pertinent to a particular date with an image.

FIG. 1 illustrates associating a quantity of information, pertinent to a particular date, with an image. With reference to FIG. 1, an information display 100 is shown containing a quantity of information pertinent to a particular date or time. An image of a birthday present at 110 conveys the information of Ann's birthday. The terms "icon" and "image" are used in the art to generally refer to graphical symbols such as the birthday present described in 110. The term "icon" could be used to refer to 110 without any loss of accuracy or generality. Through this detailed description of the invention, icon and image will be used interchangeably. The present invention is not limited by the reference made to the symbol used to communicate information to the user.

A date of June 16 is indicated at 112. Within the teachings of the present invention, "time" will encompass both date and time, no distinction need be made, thus, June 16 at 112 can be referred to as the time of Ann's Birthday or the date of Ann's Birthday. 112 is also an example of information that is pertinent to a period of time. It is generally accepted that a birthday describes an entire day even though a person is born at a particular time on a particular day. Thus, it is the commonly accepted custom to refer to an entire day as being descriptive of a person's birthday. The association made between the information communicated and the date or time associated with the information does not limit the present invention.

FIG. 2 illustrates an example of associating a quantity of information pertinent to a particular time and place with an image. With reference to FIG. 2, a leaf 210 conveys the information that leaves are turning color and this color will have a distribution associated with it making the color a function of time. A location for this information is New Hampshire and the distribution of the information is illustrated by a distribution 212 which shows "fall foliage color intensity" over a period of several months.

Figure 3:
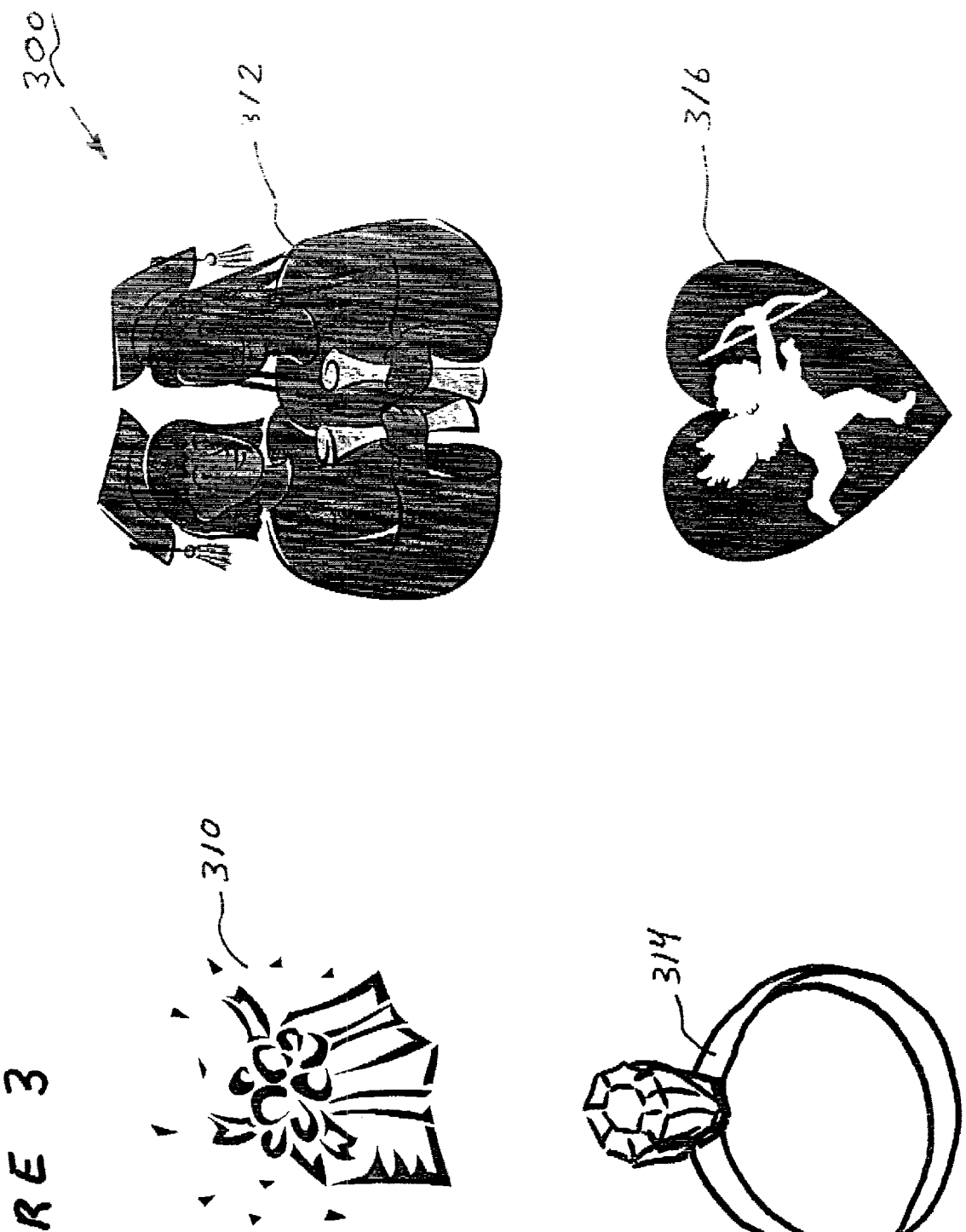
FIG. 3 illustrates different images.

FIG. 3 illustrates a non-exclusive group of icons that can be used according to the teaching of the present invention to convey a quantity of information. With reference to FIG. 3, a wrapped present 310 may be used to indicate a birthday, a ring 314 can be used to indicate an engagement or anniversary. A graduation can be indicated by an icon at 312. Valentines Day can be indicated by an icon at 316. Many different icons or images can be used according to the teaching of the present invention to convey the quantity of information. The type of icon or image used does not limit the present invention. The examples of icons shown in FIG. 3 are useful for imparting information pertinent to a period of time such as a day. In an alternative embodiment of the present invention it is desirable to relate the information to an instant of time or a distribution of a value of a variable over time.

Figure 4:
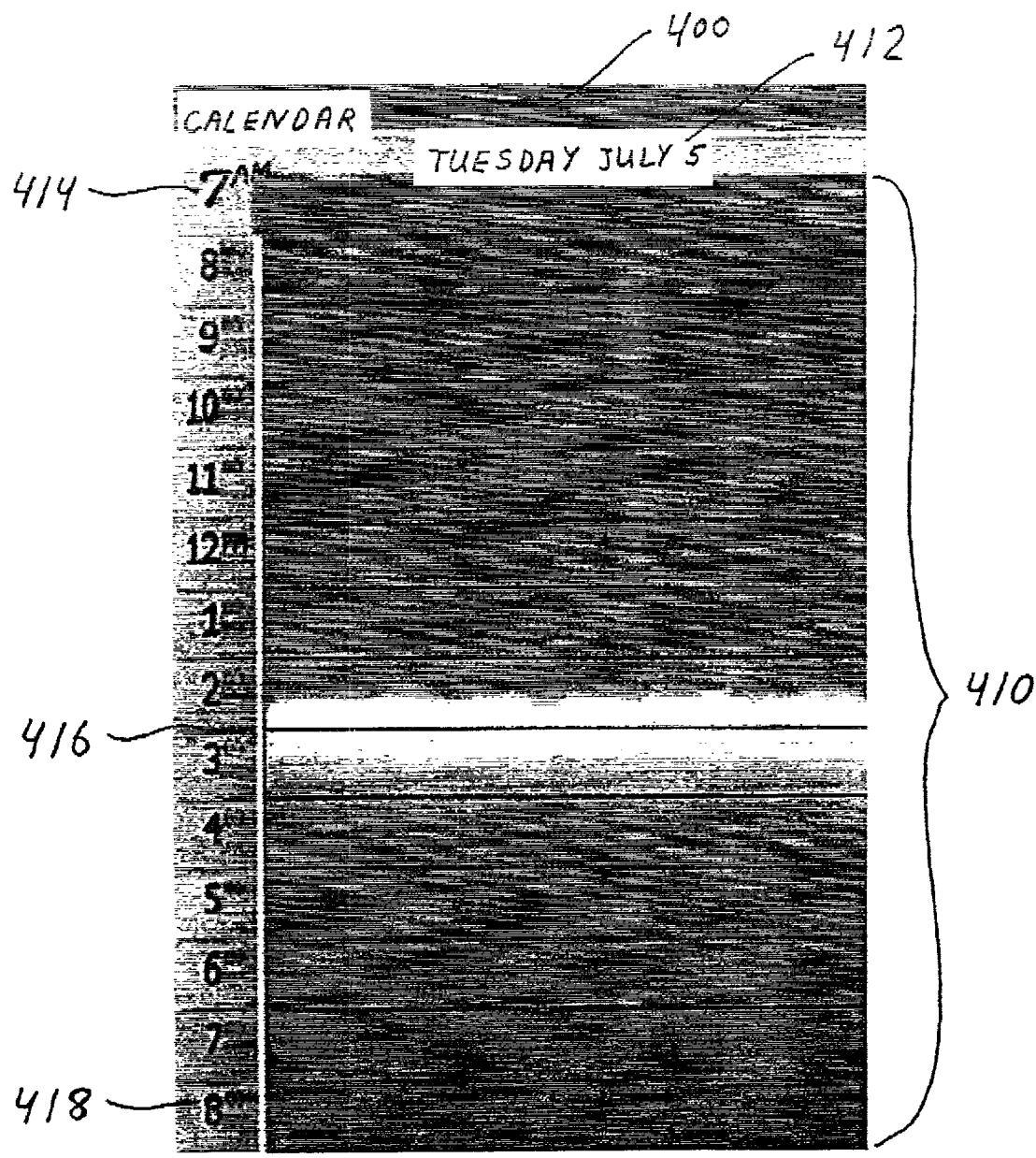
FIG. 4 shows a variation of a quantity of information during a period of time.

FIG. 4 shows a variation of a quantity of information during a period of time. In one embodiment, the present invention can be used to communicate to the user of an information display the relative daily outdoor ambient light (percentage of maximum daily sunlight) at a particular time and place in the future. The information display can be any information display such as those used with a computer, a cell phone or any other electronic device used to process information. With reference to FIG. 4, the quantity of information displayed (percentage of maximum daily sunlight) is associated with the brightness of the backlight of the information display. A page of a calendar, used in a scheduling application on the user's information display is shown at 400. The brightness of the backlight of the information display is indicated by a display intensity 410. The brightness of the information display varies from a minimum at 414 (approximately 7 AM corresponding to a time around sunrise) to a maximum at 416 (approximately 2:30 PM corresponding to peak sunlight) back to a minimum at 418 (approximately 8 PM corresponding to a time around sunset). In this embodiment of the present invention, the backlight intensity of the information display is correlated to the day July 5, as indicated at 412.

Figure 4A:
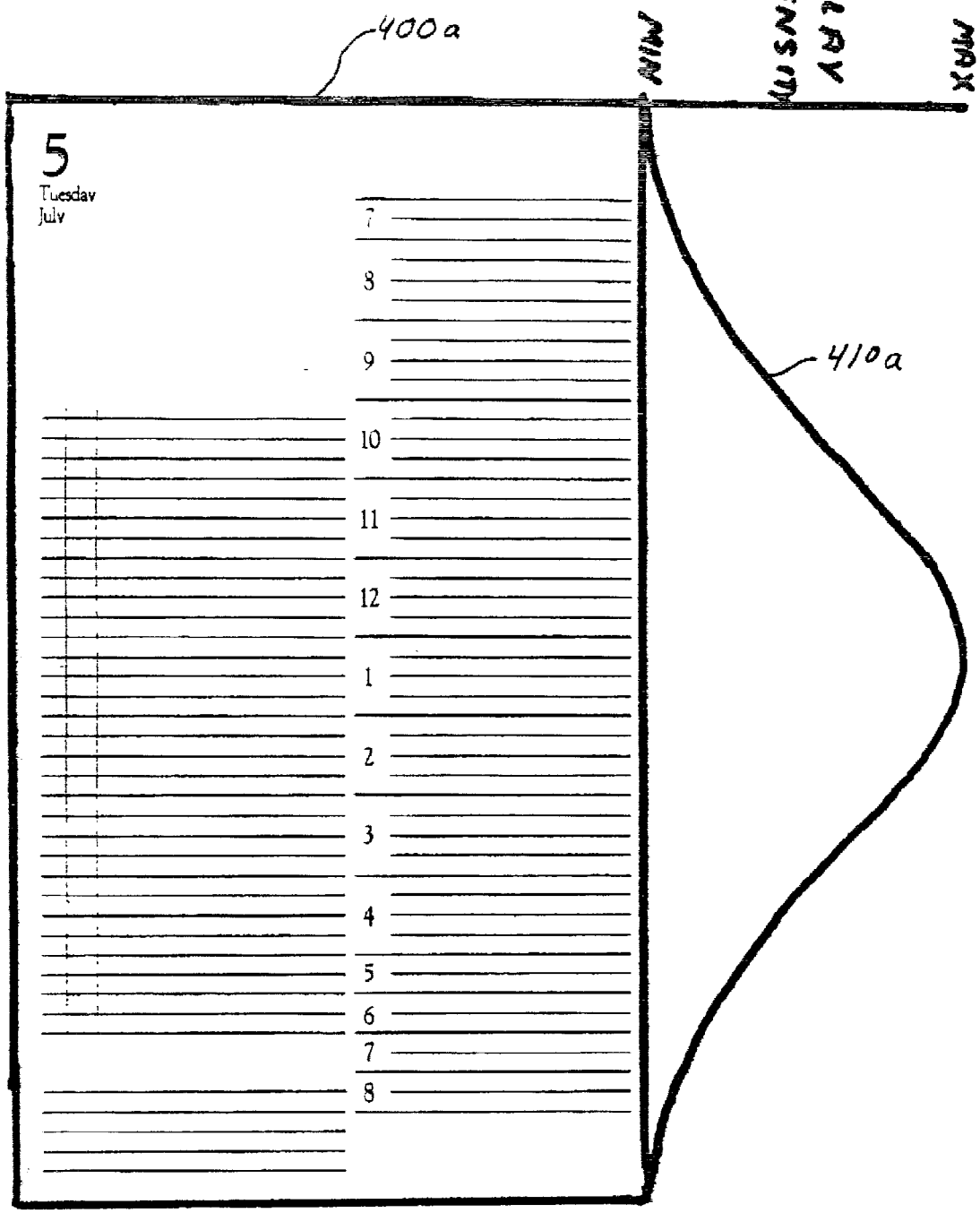
FIG. 4a illustrates an alternative way of communicating a quantity of information during a period of time.

Another way of illustrating the information communicated by FIG. 4 can be seen in FIG. 4*a*. With reference to FIG. 4*a*, a display intensity 410*a*, of a display 400*a*, is drawn as a two dimensional plot of intensity verses time. The distribution 410*a* corresponds to the brightness of the backlight of the information display illustrated in FIG. 4 as the intensity modulated image 410. The distribution 410*a* is another way of communicating to the user the information communicated in FIG. 4 according to the teachings of the present invention.

The information used by the present invention can come from several sources depending on the nature of the information. Information can be personal to the user or general information that is common to all users. Examples of personal information are Birthday's such as Ann's Birthday 110 in FIG. 1. An example of general information can be the percentage of maximum daily sunlight described in conjunction with FIG. 4.

Personal information can be assigned by the user. The user can input a list of birthdays, anniversaries and other special event that the user wishes to associate with the particular date, time, and/or place. This list can be different for each user and is separately configurable according to the needs of the individual user, the present invention is not limited thereby.

Information may be further categorized by the degree to which the information is determinable. For example, well determined information such as sunrise and sunset, tide heights, and phase of the moon are capable of being calculated far in advance of the actual date, time, and place with which the information pertains. Well-determined information can be programmed into a data processing system associated with the information display. As the user requires information for a future date, time or place, the user of the information display would retrieve the required information by methods well known in the art. In addition, the information display or associated data processing system may be equipped with a global position system (GPS) receiver to obtain a location. The location is used when the information desired is a function of position with respect to celestial bodies such as the sun or moon. Position information, provided by the GPS receiver can be used to obtain "percentage of maximum daily sunlight," tide height, and phase of the moon since these parameters vary according to absolute position on the earth.

In an alternative embodiment, this determinable general information can be obtained via connection to the Internet and querying an appropriate web-site such as "http://aa.usno.navy.mil/." This web site will provide sun and moon data that can be obtained and displayed on the information display according to the teachings of the present invention described herein.

In another embodiment, a zip code can be used to obtain the location. A data processing system, such as a computer, can be configured to calculate a location based on the zip code by methods well known in the art. The location is then used as previously described to calculate the determinable information. Such a method of obtaining location is useful when a GPS receiver is not available to provide location, or when the GPS receiver does not have a clear view of the sky in order to receive the GPS signals.

Alternatively, the user may wish to have information computed for a location other than the present location of the user. For example, the user may anticipate traveling to a different location for which information is desired. The user can enter the name of a geographic descriptor such as a country, a state, a city, a road, a zip code or any other geographic descriptor that is used to designate location. The information displayed on the information display would be pertinent to the location specified thereby. Such a use scenario is beneficial when the user is planning a trip. For example, planning a trip may begin at the user's home or office using a desktop computer and associated information display. As the trip proceeds the user could use a handheld held device such as a personal data assistant or a computer installed in a vehicle to display the information pertinent to the remote or second location.

Variations in the icon or image may be used to vary the information communicated to the user. FIG. 5 illustrates variations of sunlight and tide information using variations in the appearance of an icon or image. With reference to FIG. 5, an icon 510 can represent peak sunshine. A half-sun icon with an arrow as shown by an icon 512 can indicate sunrise and a half-sun icon with an arrow pointed down, an icon 514, can represent sunset. Thus, variations on the full sun icon 510 can be used to indicate variations of sunlight. Similarly, phase of the tide can be indicated by the series of icons shown in 516, 518, and 520. Low tide is indicated by icon 516 (a boat on dry land). High tide is indicated by icon 520 (a boat floating free of the bottom). A boat almost floating free of the bottom as indicated by an icon at 518 can indicate slack tide. The progressions of icons shown in FIG. 5 are illustrative of the use of icons to convey variations in a value such as sunlight and tide height, many other embodiments of the present invention are possible within the teachings presented herein.

Figure 6:
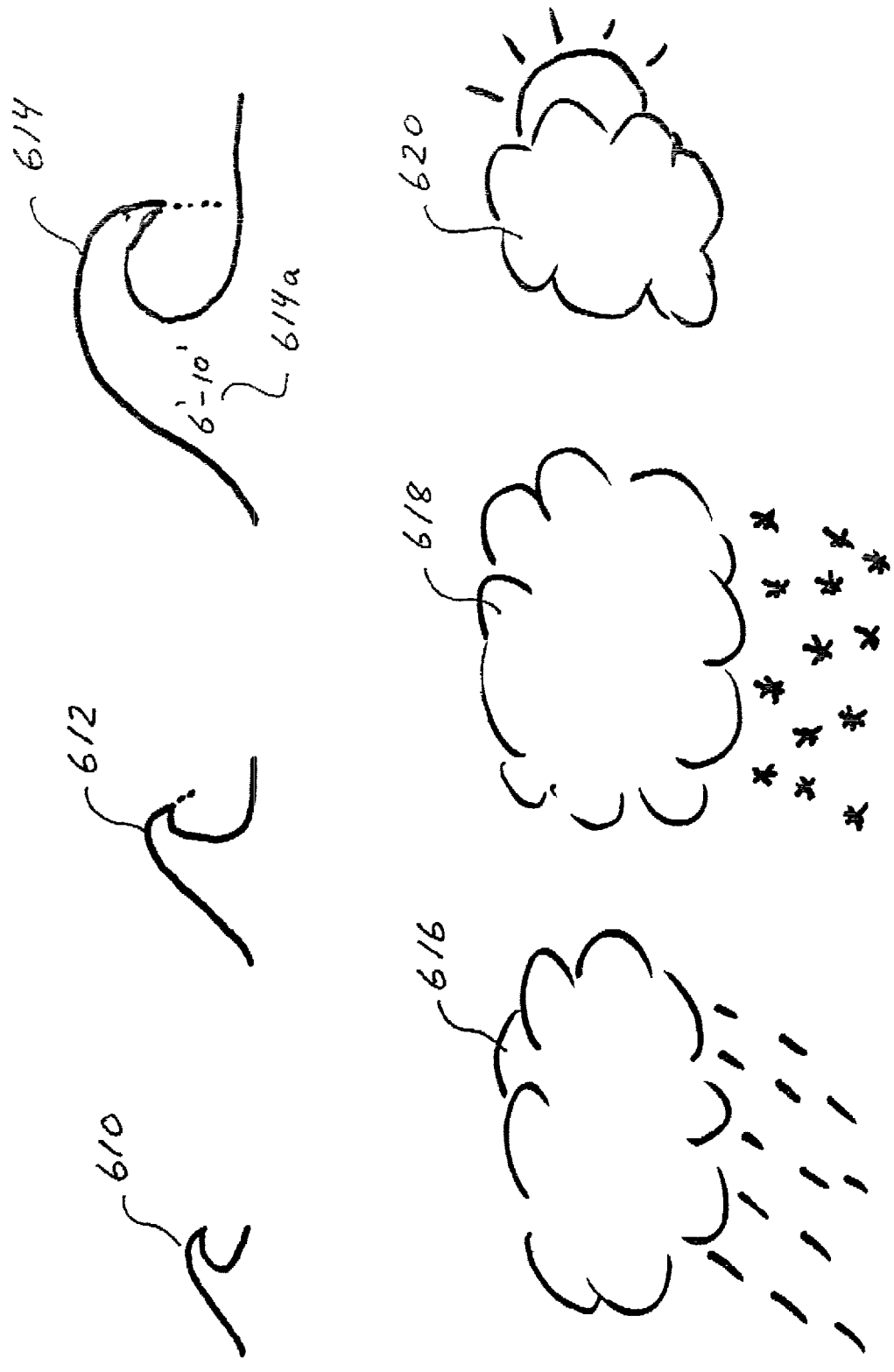
FIG. 6 depicts illustrations of less well-determined information using icons.

Information that is not well determined in advance, such as sea-state and weather can be displayed according to the teachings of the present invention. FIG. 6 depicts illustrations of less well-determined information using icons or images. In one embodiment of the present invention, a data processing system such as a computer can obtain a weather forecast or a forecast of expected sea-states (wave heights) for a date, time, and location. The weather information can be obtained by connection to the Internet and downloading the pertinent information by methods well known in the art. Alternatively, the data processing system can be configured with weather forecasting instruments such as a barometer, a thermometer, etc. to make weather predictions directly. With reference to FIG. 6, an icon 610 can indicate a low sea-state. An icon 612 can indicate a moderate sea-state and an icon 614 can indicate a high sea-state. Many modifications of the icons just described are possible within the teachings of the present invention. For example, icons 610, 612, and 614 can be supplemented with numerical wave heights corresponding to the sea-states represented thereby and shown in 614a. Icons 616, 618, and 620 can indicate weather conditions and particularly the chance of precipitation. An icon 616 can indicate rain. An icon 618 can indicate snow and an icon 620 can indicate clearing weather conditions.

The teachings of the present invention may be combined and arranged according to the desires of the user of the information display. FIG. 7 illustrates an information display configured to associate information with an image, and the corresponding pertinent time of association. In one embodiment of the present invention, the user, from the information display shown in 700, may access various quantities of information for display. With reference to FIG. 7, a non-exclusive list of icons is shown at the top of information display screen 700. The user can select sun icon 702 by means well known in the art, such as clicking on the icon 702 with a mouse, touching the screen of information display 700 with a stylus, or speaking a voice command if the application is speech enabled. A selection made thereby can result in another screen whereby the user could select from a list of icons represented by 510, 512, and 514 (FIG. 5). Selection of 510 (FIG. 5) and a particular day from the calendar shown in information display 700 (FIG. 7) can result in the display 400 shown in FIG. 4. Alternatively, selection of 512 or 514 (FIG. 5) can result in placing the appropriate sunrise or sunset icon on each day of the calendar shown in information display 700 or on a particular day selected therefrom.

Many additional combinations and arrangements of the present invention are possible. For example, the progressive wave height technique illustrated in 610, 612, and 614 can be combined with the icons shown in FIG. 3 (pertinent to a period of time e.g., a "special day") to indicate an approaching event. On a number of days preceding a particular "special day" the icons can fade-in from weak to strong indicating the approaching "special day."Alternatively, or in addition to the fade-in technique, the icon can contain a number such as five or "5" indicating that it is "5" days to the "special day." A variation on this embodiment can be to supplement the fade-in icon with the date of the "special day." A combination of both dates are possible whereby the icon can be supplemented with a message such as "5" days to June $16^{th}$.

Another example of combining teachings of the present invention is to combine the display backlight modulation of FIG. 4 and FIG. 4a with the distribution shown at 212 in FIG. 2. Many other combinations of the teachings of the present invention are possible. The present invention is not limited by the value of the variables or the variables used to communicate the information to the user via the information display.

Motion can be used to convey information to the user via the teachings of the present invention by animating the icon or image. For example, urgency can be conveyed by blinking a "special day" or blinking a severe weather alert icon displayed on the information display.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Thus, novel methods and apparatuses are disclosed that relay to a user of an information display a quantity of information that is pertinent to a particular time and/or place. Although the invention is described herein with reference to specific preferred embodiments, many modifications therein will readily occur to those of ordinary skill in the art. Accordingly, all such variations and modifications are included within the intended scope of the invention as defined by the following claims.

What is claimed is:

1. A handheld computing device comprising:

An information display; and a calendar to be displayed on the information display, wherein an image representing a percentage of maximum daylight for a location at a selected time is associated with a calendar entry to be displayed on the information display, wherein the brightness of the information display is varied to correspond to the percentage of maximum daylight associated with two or more times for the calendar entry.

2. The device of claim 1, wherein a first calendar entry time has a first brightness corresponding to a first percentage of maximum daylight and a second calendar entry time has a second brightness corresponding to a second percentage of maximum daylight.

3. A method comprising:

determining a characteristic environmental condition for a location at a selected time;

associating the characteristic environmental condition with a calendar entry;

associating the characteristic environmental condition with an image;

displaying the image of the characteristic environmental condition on an information display; and displaying a calendar on the information display, wherein the brightness of the information display is varied to correspond to the percentage of the maximum daylight associated with two or more times for the calendar entry, for a location.

4. The method of claim 3 wherein the environmental condition is comprised from a group consisting of percentage of maximum daylight, sunrise, sunset, phase of the moon, tide height, wave height, wind speed, probability of precipitation, weather conditions.

5. The method of claim 3 wherein the environmental condition comprises a percentage of maximum daylight.

6. The method of claim 5 further comprising:

associating a first time of the calendar entry with a first percentage of maximum daylight; and associating a second time of the calendar entry with a second percentage of maximum daylight.

7. The method of claim 6 further comprising:

associating a first display brightness level with the first percentage of maximum daylight; and associating a second display brightness level with the second percentage of maximum daylight.

8. The method of claim 7 further comprising:

displaying the first brightness level in association with the first time of the calendar entry; and displaying the second brightness level in association with the second time of the calendar entry.

9. The method of claim 6 further comprising:

associating a first display background intensity level with the first percentage of maximum daylight; and associating a second display background intensity level with the second percentage of maximum daylight.

10. The method of claim 9 further comprising:

displaying the first background intensity level in association with the first time of the calendar entry; and displaying the second background intensity level in association with the second time of the calendar entry.

11. A computer readable medium containing executable computer program instructions, which when executed by a data processing system, cause the data processing system to perform a method to display a variable on an information display, comprising:

determining a characteristic environmental condition for a location at a selected time;

associating the characteristic environmental condition with a calendar entry;

associating the characteristic environmental condition with an image;

displaying the image of the characteristic environmental condition on an information display; and displaying a calendar on the information display, wherein the brightness of the information display is varied to correspond to the percentage of the maximum daylight associated with two or more times for the calendar entry, for a location.

12. The computer readable medium of claim 11 wherein the environmental condition is comprised from a group consisting of percentage of maximum daylight, sunrise, sunset, phase of the moon, tide height, wave height, wind speed, probability of precipitation, weather conditions.

13. The computer readable medium of claim 11 wherein the environmental condition comprises a percentage of maximum daylight.

14. The computer readable medium of claim 13 further comprising:

associating a first time of the calendar entry with a first percentage of maximum daylight; and associating a second time of the calendar entry with a second percentage of maximum daylight.

15. The computer readable medium of claim 14 further comprising:

associating a first display brightness level with the first percentage of maximum daylight; and associating a second display brightness level with the second percentage of maximum daylight.

16. The computer readable medium of claim 15 further comprising:

displaying the first brightness level in association with the first time of the calendar entry; and displaying the second brightness level in association with the second time of the calendar entry.

17. The computer readable medium of claim 14 further comprising:

associating a first display background intensity level with the first percentage of maximum daylight; and associating a second display background intensity level with the second percentage of maximum daylight.

18. The computer readable medium of claim 17 further comprising:

displaying the first background intensity level in association with the first time of the calendar entry; and displaying the second background intensity level in association with the second time of the calendar entry.

* * * * *